United States Patent
Lee et al.

(10) Patent No.: US 6,292,245 B1
(45) Date of Patent: *Sep. 18, 2001

(54) LIQUID CRYSTAL DISPLAY DEVICE WITH IN-PLANE SWITCHING MODE HAVING RECTANGULAR PIXEL AND COUNTER ELECTRODES

(75) Inventors: Seung Hee Lee; Hyang Yul Kim, both of Ich'on (KR)

(73) Assignee: Hyundai Electronics Industries Co., Ltd., Kyoungki-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,355

(22) Filed: Nov. 24, 1998

(30) Foreign Application Priority Data

Dec. 3, 1997 (KR) .................................................. 97-65591

(51) Int. Cl.[7] .................................................. G02F 1/1343
(52) U.S. Cl. ............................................ 349/139; 349/141
(58) Field of Search ................................ 349/42, 43, 141, 349/139

(56) References Cited

U.S. PATENT DOCUMENTS

| | | | |
|---|---|---|---|
| 5,598,285 | * | 1/1997 | Kondo et al. .......................... 349/42 |
| 5,734,451 | * | 3/1998 | Yanagawa et al. ..................... 349/43 |
| 5,745,207 | * | 4/1998 | Asada et al. ............................ 349/42 |
| 5,760,857 | * | 6/1998 | Yanagawa et al. ..................... 349/43 |
| 5,886,762 | * | 3/1999 | Lee et al. .............................. 349/141 |
| 5,977,562 | * | 11/1999 | Hirakata et al. ...................... 349/141 |

FOREIGN PATENT DOCUMENTS 09105908    4/1997   (JP) .

* cited by examiner

Primary Examiner—Walter J. Malinowski
(74) Attorney, Agent, or Firm—Ladas & Parry

(57) ABSTRACT

A liquid crystal display device with an in-plane switching mode capable of preventing color shift occurrence is disclosed. A liquid crystal display device according to the present invention, includes counter and pixel electrodes for driving liquid crystal formed on the same substrate. Here, when a voltage is applied to the counter and pixel electrodes, both a first electric field of a parallel direction and a second electric field of a vertical direction are formed between the electrodes.

18 Claims, 3 Drawing Sheets

LIQUID CRYSTAL DISPLAY DEVICE WITH IN-PLANE SWITCHING MODE HAVING RECTANGULAR PIXEL AND COUNTER ELECTRODES

BACKGROUND OF THE INVENTION

1. Field of the Invention

The present invention relates to a liquid crystal display device(LCD), and more particularly to a liquid crystal display device with an in-plane switching(IPS) mode capable of preventing color shift occurrence.

2. Description of the Related Art

An IPS mode-LCD(refer to Principle and Characteristics of Electro-optical Behaviour with In-Plane Switching mode; Asia Display '95, pp 578–580, Hitachi, Japan) is proposed, to improve narrow view-angle in a twisted nematic(TN) mode-LCD. In this IPS mode-LCD, electrodes(both pixel and counter electrodes) for driving liquid crystal are formed on a lower substrate differently from the TN mode-LCD. The IPS mode-LCD has wide view-angle, since the liquid crystal molecules turn in keeping their long axes parallel to the plane of the substrate by a parallel electric field between electrodes.

However, in the IPS mode-LCD above described, the short axes of the liquid crystal molecules are viewed at one side while the long axes of them are viewed at another side, because they are arranged under the influence of only the parallel electric field. As a result, color shift which reveals different colors according to view angle occurs. For example, in case of viewing the short axes of the liquid crystal molecules, blue color having a short wavelength is displayed. On the other hand, in case of viewing the long axes of them, yellow color having a long wavelength is displayed, thereby deteriorating display quality.

SUMMARY OF THE INVENTION

It is therefore an object of the present invention to a liquid crystal display device with an in-plane switching mode capable of improving display quality by preventing color shift occurrence.

To accomplish this above object, a liquid crystal display device with an in-plane switching mode according to the present invention includes counter and pixel electrodes for driving liquid crystal formed on the same substrate. Here, when a voltage is applied to the counter and pixel electrodes, both a first electric field of a parallel direction and a second electric field of a vertical direction are formed between the electrodes.

In an embodiment of the present invention, the counter electrode includes an outer electrode having a rectangular picture frame form in a pixel region and an inner electrode disposed at a center of the outer electrode and having a reduced similar figure of the outer electrode, the portion of the inner electrode being connected to the outer electrode. Furthermore, the upper portion of the outer electrode is formed extending along the first direction to connect with another pixel region adjacent thereto.

The inner electrode includes four branches of oblique form disposed at the outside edges thereof, respectively and extending to the edges of the outer electrode. Moreover, one of the four branches is connected to the edge of the outer electrode. Furthermore, the inner electrode further includes oblique projection portions disposed at the inside edge thereof, respectively, and facing each other.

In an embodiment of the present invention, the pixel electrode includes:a first electrode disposed between the outer and inner electrode of the counter electrode and having a reduced a reduced similar figure of the outer electrode; a second electrode composed of four branches of oblique form disposed at the outside edges of the first electrode, respectively and extending the inside edges of the outer electrode; a third electrode overlapped with one of portions of the inner electrode of the parallel direction; a fourth electrode overlapped with the other of the inner electrode of the parallel direction, one side of the fourth electrode being obliquely extended to connect with the first electrode and overlapped with one of the branches of the inner electrode; and a fifth electrode arranged to the vertical direction and connecting the third electrode to the fourth electrode. Preferably, the first electrode is disposed at space between the outer and inner electrodes so that it divides the space into two equal parts. Furthermore, the fifth electrode is disposed so that it divides the space in the inner electrode into two equal parts.

Additional object, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Hereinafter, a preferred embodiment of the present invention will be explained in more detail with reference to the accompanying drawings.

Figure 1:
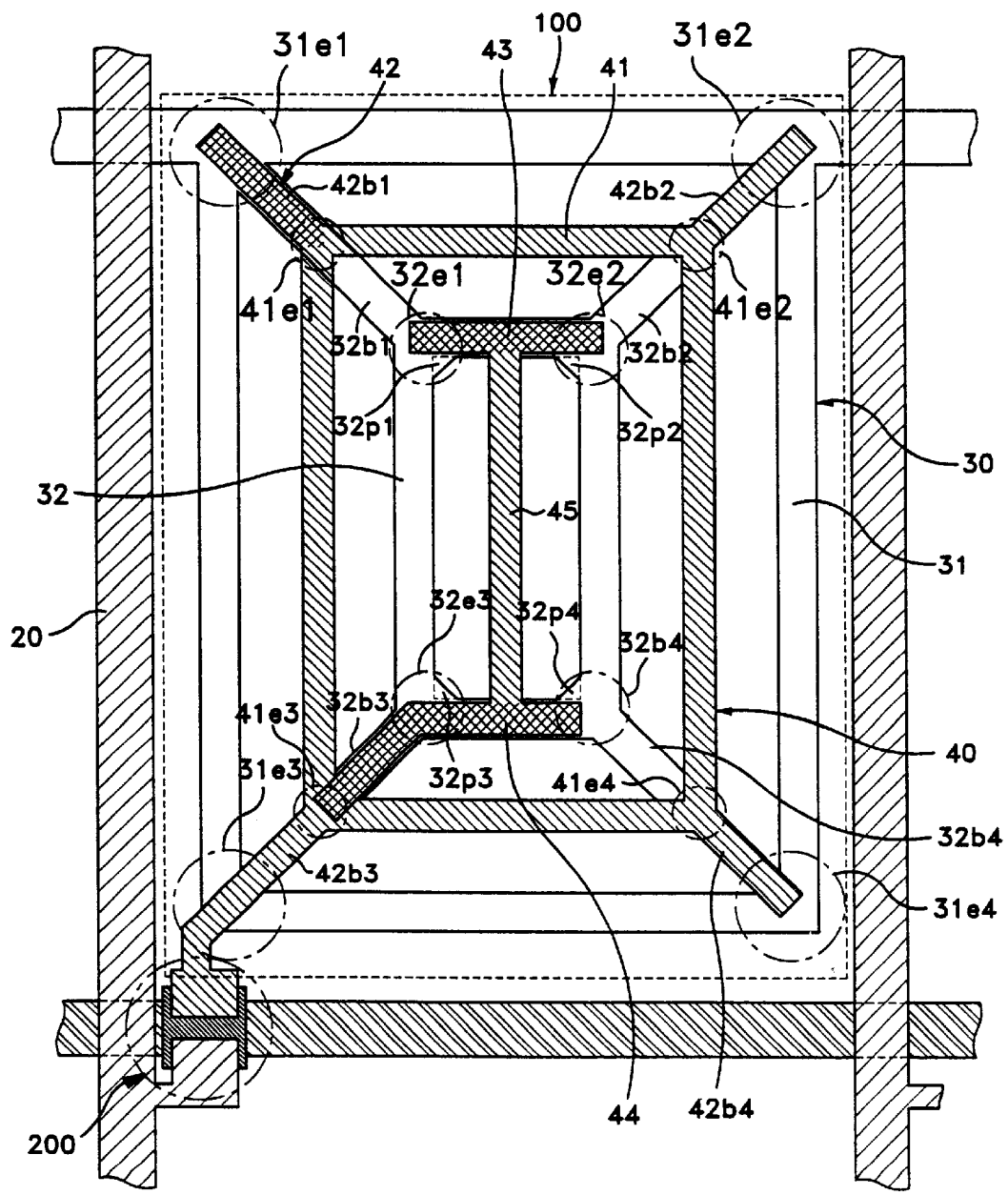
FIG. 1 shows a plan view of a pixel region for describing an IPS mode-LCD according to an embodiment of the present invention.

FIG. 1 shows a plan view of a pixel region for describing an IPS mode-LCD according to an embodiment of the present invention.

Referring to FIG. 1, a gate line 10 is formed extending along a first direction and a data line 20 is formed extending along a second direction which is orthogonal to the first direction, so that a pixel region 100 is defined. The width ratio of the first direction to the second direction is about 1:3. In addition, a TFT 200 is formed as a switching element adjacent to the cross portion of the gate line 10 and the data line 20

The pixel region 100 includes first and second electrodes for driving liquid crystal. The first electrode is a counter electrode 30 and the second electrode is a pixel electrode 40. The counter electrode 30 is made of an opaque metal layer and includes an outer electrode 31 and an inner electrode 32, as shown in FIG. 1. The outer electrode 31 has a rectangular picture frame form, and is disposed so that it is spaced with the gate line 10 and data line 20. Also, the upper portion of the outer electrode 31 is formed extending along the first direction to connect with another pixel region(not shown) adjacent thereto. The inner electrode 32 has a reduced similar figure of the outer electrode 31. The inner electrode 32 also includes oblique projection portions 32*p*1, 32*p*2, 32*p*3, and 32*p*4 disposed at the inside edges 32*e*1, 32*e*2, 32*e*3, and 32*e*4 of the inner electrode 32, respectively and facing to each other, to reduce parasitic electric field at the edges. Furthermore, the inner electrode 32 has first to fourth branches 32b1, 32b2, 32b3, and 32b4 of oblique form disposed at the outside edges 32e1, 32e2, 32e3, and 32e4 of the inner electrode 32, respectively. The first to fourth branches 32b1, 32b2, 32b3, and 32b4 are extended to the edges 31e1, 31e2, 31e3, and 31e4 of the outer electrode 31. Of these, one spaced from the gate line 10 far away, for example, the first branch 32b1, is connected to the edge 31e1 of the outer electrode 31 and has a longer length than the others.

The pixel electrode 40 includes first to fifth electrodes 41 to 45, as shown in FIG. 1. The first electrode 41 has a reduced similar figure of the outer electrode 31, and is disposed at space between the outer and inner electrodes 31 and 32 so that it divides the space into two equal parts. The second electrode 42 is composed of four branches 42b1, 42b2, 42b3, and 42b4 of oblique form disposed at the outside edges 41e1, 41e2, 41e3, and 41e4 of the first electrode 41, respectively. The four branches 41b1, 41b2, 41b3, and 41b4 are extended to the edges 31e1, 31e2, 31e3, and 31e4 of the outer electrode 31. Preferably, the four branches 41b1, 41b2, 41b3, and 41b4 are extended so that they are overlapped with a selective portion of the outer electrode 31. Of these, one 42b1 is also overlapped with the first branch 32b1, and another 42b3 being close to the TFT 200 is connected to the TFT 200. The third electrode 43 is overlapped with one of portions of the inner electrode 32 being parallel to the first direction and the fourth electrode 44 is overlapped with the other of the inner electrode 32. One side of the fourth electrode 44 is obliquely extended to connect with the first electrode 41 and overlap the third branch 32b3 of the inner electrode 32. The fifth electrode 45 is arranged to be parallel to the second direction, so that it connects the third electrode 43 to the fourth electrode 44. Preferably, the fifth electrode 45 is disposed so that it divides the space in the inner electrode 32 into two equal parts.

Furthermore, the counter electrode 30 and the gate line 10 are formed on the same plane, and the pixel electrode 40 and the data line 20 are formed on the same plane. A insulating layer(not shown) is interposed between the counter electrode 30 and the pixel electrode 40. Storage capacitors are respectively formed in overlapped portions of the first branch 32b1 and the second electrode 42b1, and of the inner electrode 32 and the third branch 32b3 and the third and fourth electrodes 43 and 44, respectively.

Figure 2:
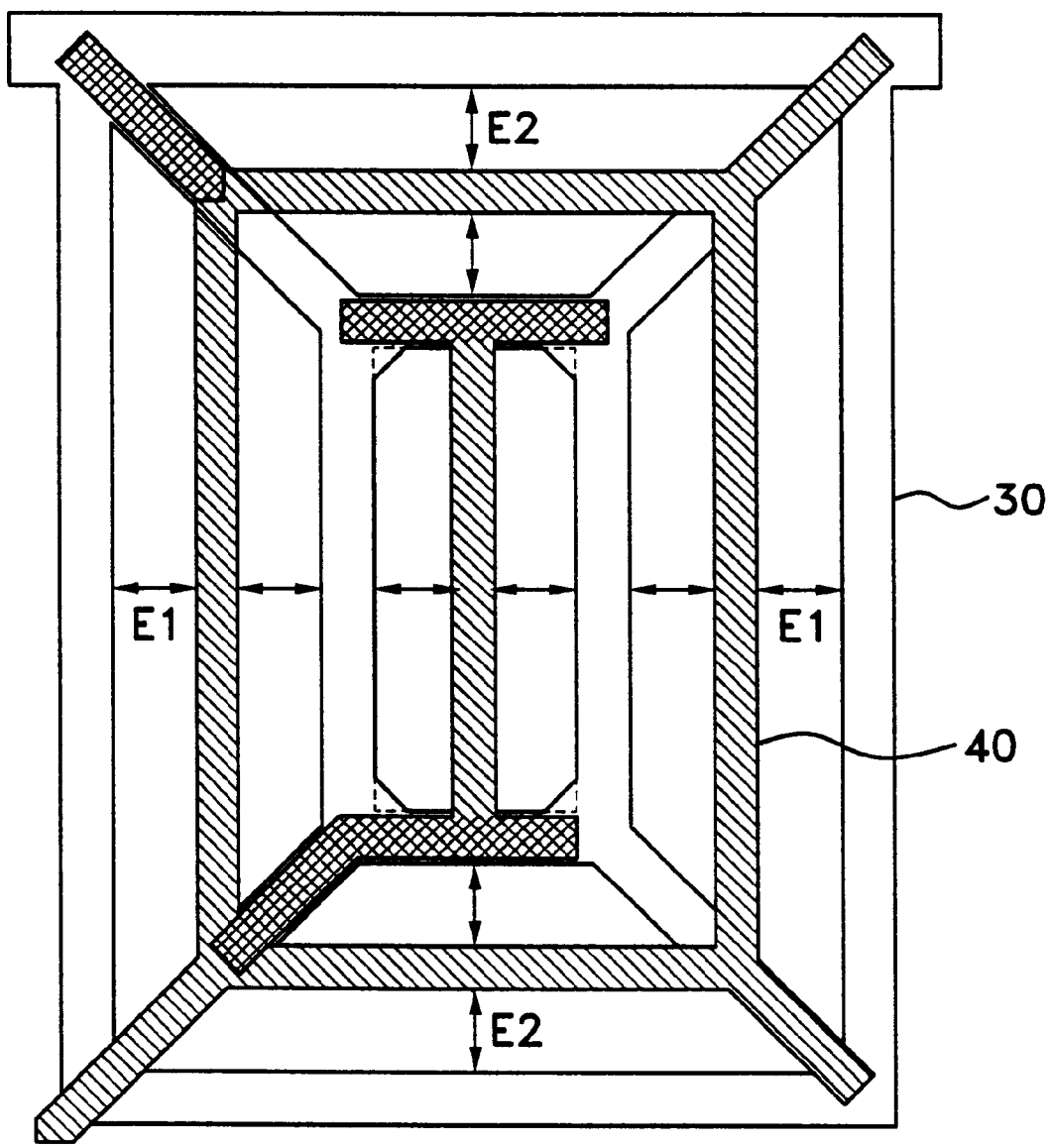
FIG. 2 and FIG. 3 are explanatory diagrams for explaining effect of an IPS mode-LCD according to the present invention compared with the prior art.
Figure 3:
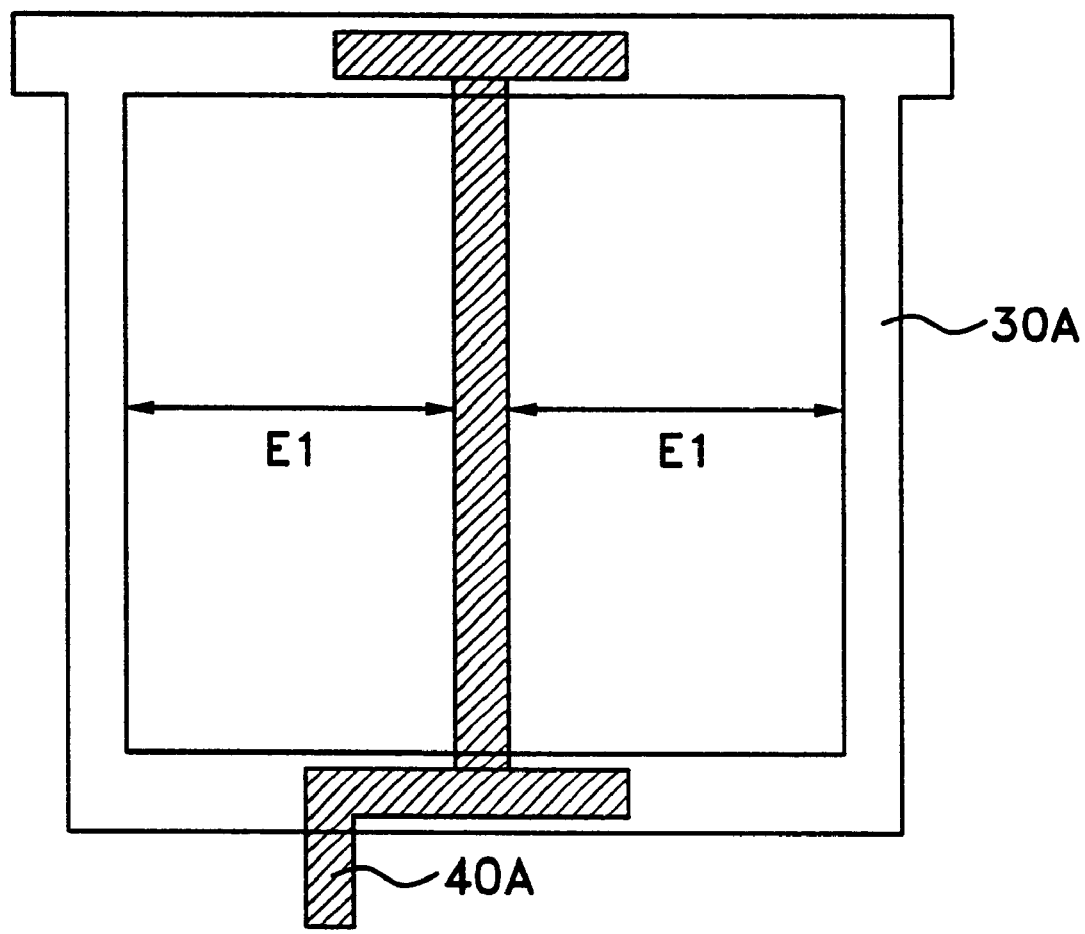

FIG. 2 and FIG. 3 are explanatory diagrams for explaining effect of an IPS mode-LCD according to the present invention compared with the prior art. When voltage is applied to counter electrodes 30 and 30A and pixel electrodes 40 and 40A, respectively, in the prior art a parallel electric field E1 is only formed between the counter electrode 30A and the pixel electrode 40A as shown in FIG. 3. On the other hand, in the present invention, both parallel electric field E1 and vertical electric field E2 are formed between the counter electrode 30 and the pixel electrode 40, as shown in FIG. 2.

Hereinafter, operation of a LCD employing the above electrode structure according to the present invention will be explained.

As not shown in drawing, a lower substrate on which the above electrodes (refer to FIG. 1) are formed is disposed opposite to an upper substrate. A liquid crystal layer having liquid crystal molecules is interposed between the lower and upper substrates. The liquid crystal molecules have positive dielectric anisotropy. Homogeneous alignment films are applied to the lower and upper substrates, respectively. The homogeneous alignment films are rubbed in a direction of 45° with respective to the data line 20 (refer to FIG. 1) and are anti-parallel to each other. Also, the homogeneous films are rubbed so that the liquid crystal molecules have a pretilt angle of below 60°. A polarizer is arranged on the outside of the lower substrate, and an analyzer is arranged on the outside of the upper substrate. The polarization axes of the polarizer and analyzer are orthogonal to each other. The polarization axis of the polarizer is in good agreement with the alignment direction of the homogeneous alignment film which applied to the lower substrate.

When the voltage is not applied, the arrangement of the liquid crystal molecules are homogeneous due to the homogeneous alignment films and their optical axis is in good agreement with the polarization axis of the polarizer. Therefore, incident light becomes linearly polarized light at the polarizer to reach the analyzer due to the homogeneous arrangement of the liquid crystal molecules, and a dark state exists because the incident light is not in good agreement with the polarization axis of the analyzer through which the light must exit.

On the other hand, when the voltage is applied to the counter electrodes 30 and 40 (refer to FIG. 1), both a parallel electric field E1 and a vertical electric field E2 are formed between the counter and pixel electrodes 30 an 40, as shown in FIG. 2, and the liquid crystal molecules move under the influence of the parallel and vertical electric field E1 and E2. That is, the liquid crystal molecules influenced by the parallel electric field E1 are arranged so that their the long axes are parallel to the parallel electric field El. The liquid crystal molecules influenced by the vertical electric field E2 are arranged so that their long axes are parallel to the vertical electric field E2. As a result, a plurality of domains are formed. Accordingly, the incident light which have been changed to linearly polarized light at the polarizer, changes to elliptically polarized light through the liquid crystal layer, and a bright state exists because most of the incident light passes through the analyzer. Furthermore, in case of viewing the liquid crystal molecules at a selective direction, both the short axes and the long axes of them are displayed, thereby preventing color shift occurrence.

According to the present invention, by changing a structure counter and pixel electrodes, both a parallel electric field and a vertical electric field are formed between the electrodes. As a result, liquid crystal molecules move under the influence of two electric field being orthogonal to each other, so that a plurality of domains are formed. Accordingly, in case of viewing the liquid crystal molecules at a selective direction, both the short axes and the long axes of them are displayed, thereby preventing color shift occurrence. Finally, display quality of the IPS mode-LCD is improved.

Although the preferred embodiment of this invention has been disclosed for illustrative purpose, those skilled in the art will appreciate that various modifications, additions and substitutions are possible, without from the scope and spirit of the invention as described in the accompanying claims.

What is claimed is:

1. A liquid crystal display device with an in-plane switching mode, the liquid crystal display device comprising:
   a gate line and a data line disposed to be orthogonal to each other and defining a pixel region;
   a thin-film transistor disposed at a cross portion of the gate line and the data line;
   an outer electrode located at an outside edge of the pixel region and connected with a common electrode line, and a counter electrode having an inner electrode connected to the outer electrode and disposed at an inside of the outer electrode; and a pixel electrode formed between the outer electrode and the inner electrode of the counter electrode and on the inner electrode, and connected to the thin-film transistor;

wherein when a voltage is applied to the counter electrode and the pixel electrode, both a first electric field perpendicular to the data line and a second electric field parallel to the data line are formed between the counter electrode and the pixel electrode.

2. The liquid crystal display device according to claim 1, wherein the outer electrode is a rectangle in the pixel region and wherein the inner electrode is centered within the outer electrode and wherein the inner electrode has a miniaturized figure of the outer electrode and wherein a portion of the inner electrode is connected electrically to the outer electrode.

3. The liquid crystal display device according to claim 2, wherein an upper portion of the outer electrode is formed extending along a direction of a shorter side of the outer electrode to connect with another pixel region adjacent thereto.

4. The liquid crystal display device according to claim 2, wherein the inner electrode comprises four branches of an oblique form with respect to each side of the outer electrode disposed at the outside edges thereof, respectively and extending to the edges of the outer electrode.

5. The liquid crystal display device according to claim 4, wherein one of the four branches is connected to the edge of the outer electrode.

6. The liquid crystal display device according to claim 4, wherein the inner electrode further comprises oblique projection portions disposed at the inside edge thereof, respectively, and facing each other.

7. The liquid crystal display device according to claim 2, wherein the pixel electrode comprises:

a first electrode disposed between the outer and inner electrode of the counter electrode and having a miniaturized figure of the outer electrode, a second electrode composed of four branches of an oblique form with respect to each side of the outer electrode disposed at the outside edges of the first electrode, respectively and extending the inside edges of the outer electrode;

a third electrode overlapped with one of portions of the inner electrode of the parallel direction;

a fourth electrode overlapped with the other of the inner electrode of the parallel direction, one side of the fourth electrode being obliquely extended to connect with the first electrode and overlapped with one of the branches of the inner electrode; and a fifth electrode arranged to the vertical direction and connecting the third electrode to the fourth electrode.

8. The liquid crystal display device according to claim 7, wherein the first electrode is disposed at space between the outer and inner electrodes so that it divides the space into two equal parts.

9. The liquid crystal display device according to claim 7, wherein the fifth electrode is disposed so that it divides the space in the inner electrode into two equal parts.

10. A liquid crystal display device with in-plane switching mode, comprising:

gate and data line disposed to be orthogonal to each other and defining a pixel region;

a switching element disposed at cross portion of the gate and data line; and counter and pixel electrodes disposed at the pixel electrode, respectively, wherein the counter electrode comprises:

an outer electrode having a rectangular picture frame form in a pixel region; and an inner electrode disposed at a center of the outer electrode and having a miniaturized figure of the outer electrode, the portion of the inner electrode being connected to the outer electrode, wherein the pixel electrode comprises:

a first electrode disposed between the outer and inner electrode of the counter electrode and having a miniaturized figure of the outer electrode;

a second electrode composed of four branches of oblique form disposed at the outside edges of the first electrode, respectively and extending the inside edges of the outer electrode;

a third electrode overlapped with one of portions of the inner electrode of a direction of the gate line;

a fourth electrode overlapped with the other of the inner electrode of the direction of the gate line, one side of the fourth electrode being obliquely extended to connect with the first electrode and overlapped with one of the branches of the inner electrode; and a fifth electrode arranged to a direction of the data line and connecting the third electrode to the fourth electrode.

11. The liquid crystal display device according to claim 10, wherein the upper portion of the outer electrode is formed extending along the direction of the gate line to connect with another pixel region adjacent thereto.

12. The liquid crystal display device according to claim 10, wherein the inner electrode comprises four branches of an oblique form with respect to each side of the outer electrode disposed at the outside edges thereof, respectively and extending to the edges of the outer electrode.

13. The liquid crystal display device according to claim 12, wherein one of the four branches is connected to the edge of the outer electrode.

14. The liquid crystal display device according to claim 13, wherein the inner electrode further comprises oblique projection portions disposed at the inside edges thereof, respectively, and facing each other.

15. The liquid crystal display device according to claim 10, wherein the first electrode of the pixel electrode is disposed at space between the outer and inner electrodes so that it divides the space into two equal parts.

16. The liquid crystal display device according to claim 10, wherein the four branches of the second electrode are overlapped with a selective portion of the outer electrode, and one of these is connected to the switching element.

17. The liquid crystal display device according to claim 10, the fifth electrode of the pixel electrode is disposed so that it divides the space in the inner electrode into two equal parts.

18. The liquid crystal display device according to claim 10, the width ratio of the gate line direction and data line direction is about 1:3.

* * * * *